United States Patent
Wakuda

(10) Patent No.: US 11,770,086 B2
(45) Date of Patent: Sep. 26, 2023

(54) OPERATION DEVICE AND VIBRATION GENERATING DEVICE

(71) Applicant: ALPS ALPINE CO., LTD., Tokyo (JP)

(72) Inventor: Hiroshi Wakuda, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 463 days.

(21) Appl. No.: 17/183,727

(22) Filed: Feb. 24, 2021

(65) Prior Publication Data

US 2021/0184611 A1   Jun. 17, 2021

Related U.S. Application Data

(63) Continuation of application No. PCT/JP2019/010391, filed on Mar. 13, 2019.

(30) Foreign Application Priority Data

Aug. 29, 2018  (JP) ................................ 2018-160752

(51) Int. Cl.
   *G05G 1/02*  (2006.01)
   *H02P 25/034*  (2016.01)
   (Continued)

(52) U.S. Cl.
   CPC ............ *H02P 25/034* (2016.02); *G06F 3/016* (2013.01); *H02K 33/18* (2013.01)

(58) Field of Classification Search
   CPC ......... G05G 1/02; G06F 3/0338; G06F 3/016; H02P 25/034; H02K 33/18
   See application file for complete search history.

(56) References Cited

U.S. PATENT DOCUMENTS

| 6,982,696 | B1 | 1/2006 | Shahoian |
| 9,489,810 | B2 | 11/2016 | Tissot |

(Continued)

FOREIGN PATENT DOCUMENTS

| JP | 2003-058321 | 2/2003 |
| JP | 2007-037273 | 2/2007 |

(Continued)

OTHER PUBLICATIONS

International Search Report for PCT/JP2019/010391 dated Jun. 18, 2019.

(Continued)

*Primary Examiner* — Cortez M Cook
(74) *Attorney, Agent, or Firm* — IPUSA, PLLC

(57) ABSTRACT

An operation device includes a movable portion, a vibration generating unit, a fixed portion, a detecting unit, and a control unit. The vibration generating unit includes a movable yoke attached to the movable portion, and a fixed yoke attached to the fixed portion and disposed facing the movable yoke in a first direction. The vibration generating unit includes a permanent magnet attached to one yoke among the movable yoke and the fixed yoke, both ends of the permanent magnet in the first direction being opposite magnetic poles created by magnetization. The vibration generating unit includes an exciting coil attached to a different yoke from the one yoke among the movable yoke and the fixed yoke, the exciting coil being configured to induce magnetic flux in response to a current flowing through the exciting coil.

12 Claims, 10 Drawing Sheets

(51) Int. Cl.
G06F 3/01 (2006.01)
H02K 33/18 (2006.01)

(56) References Cited

U.S. PATENT DOCUMENTS

| | | |
|---|---|---|
| 9,911,292 B1 | 3/2018 | Khoshkava et al. |
| 2012/0313627 A1* | 12/2012 | Furukawa ............. G06F 3/0338 324/207.15 |
| 2013/0257776 A1 | 10/2013 | Tissot |
| 2014/0139476 A1 | 5/2014 | Lange et al. |
| 2018/0095536 A1* | 4/2018 | Wakuda .................. G05G 1/02 |
| 2018/0152090 A1 | 5/2018 | Umehara et al. |
| 2018/0196518 A1 | 7/2018 | Shibata et al. |

FOREIGN PATENT DOCUMENTS

| | | |
|---|---|---|
| JP | 2013-540328 | 10/2013 |
| JP | 2016-163854 | 9/2016 |
| JP | 2017-004261 | 1/2017 |
| JP | 2018-074899 | 5/2018 |
| JP | 2018-086622 | 6/2018 |
| KR | 10-1250288 | 4/2013 |

OTHER PUBLICATIONS

The Extended European Search Report for 19853737.5 dated Jul. 8, 2022.
The Partial Supplementary European Search Report for 19853737.5 dated Apr. 19, 2022.

* cited by examiner

OPERATION DEVICE AND VIBRATION GENERATING DEVICE

CROSS-REFERENCE TO RELATED APPLICATION

This application is a continuation application of International Application No. PCT/JP2019/010391 filed on Mar. 13, 2019, and designated the U.S., which claims priority to Japanese Patent Application No. 2018-160752, filed on Aug. 29, 2018, the entire contents of which are incorporated herein by reference in their entirety.

BACKGROUND

1. Field of the Invention

The present disclosure relates to an operation device and a vibration generating device.

2. Description of the Related Art

Operation devices such as touch pads in which an input operation can be performed by touching a control surface have been widely used in recent years. When such an operation device is operated, an operator does not have a feel of operation, such as when operating a switching device, a potentiometer, or the like. In this regard, operation devices with force feedback are proposed in which when operated, control surfaces vibrate, thereby providing a mimic feel of operation.

For example, Patent document 1 discloses an interface module with a built-in actuator that supports a movable core from above and below, by using preloaded two elastic portions. Patent document 2 discloses a vibration generating device that includes supports with different natural lengths, and dampers, as well as including a voice coil motor, where the supports and the dampers are provided between a vibration panel and a body.

CITATION LIST

Patent Document

[Patent document 1] Japanese Translation of PCT International Application Publication No. 2013-540328
[Patent document 2] Japanese Unexamined Patent Application Publication No. 2016-163854

SUMMARY

According to the present disclosure, an operation device includes a movable portion including an operation member to be operated by pressing the operation member, and a vibration generating unit configured to cause the movable portion to vibrate in a first direction perpendicular to a control surface of the operation member. The operation device includes a fixed portion supporting the movable portion via a first elastic support to allow the movable portion to vibrate, a detecting unit configured to detect that the operation member is operated by pressing the operation member, and a control unit configured to drive the vibration generating unit in accordance with a detected result by the detecting unit. The vibration generating unit includes a movable yoke attached to the movable portion, and a fixed yoke attached to the fixed portion and disposed facing the movable yoke in the first direction. The vibration generating unit includes a permanent magnet attached to one yoke among the movable yoke and the fixed yoke, both ends of the permanent magnet in the first direction being opposite magnetic poles created by magnetization. The vibration generating unit includes an exciting coil attached to a different yoke from the one yoke among the movable yoke and the fixed yoke, the exciting coil being configured to induce magnetic flux in response to a current flowing through the exciting coil. In an initial state in which the current is yet to flow through the exciting coil, by a magnetic attractive force of the permanent magnet, the movable yoke is configured to be energized in a direction of moving closer to the fixed yoke in the first direction, the first elastic support being compressed between the movable portion and the fixed portion. The current flowing through the exciting coil causes a repulsive force to act between the movable yoke and the fixed yoke.

DESCRIPTION OF THE EMBODIMENTS

Related art information recognized by the inventor of this application is as follows. With respect to the interface module described in Patent document 1, a pose of the movable core is not stable and consequently the magnitude of the vibration may be unstable. Also, with respect to the vibration generating device described in Patent document 2, a pose of a yoke is not stable and consequently the magnitude of the vibration may be unstable.

The present disclosure has an object to provide an operation device and a vibration generating device that can generate stable vibrations.

According to the present disclosure described below, stable vibrations can be generated.

One or more embodiments of the present disclosure will be specifically described hereafter with reference to the accompanied drawings. Note that in the specification and drawings, the same numbers denote the components that have substantially the same functional configurations, and duplicate description for the components may be omitted.

Figure 1:
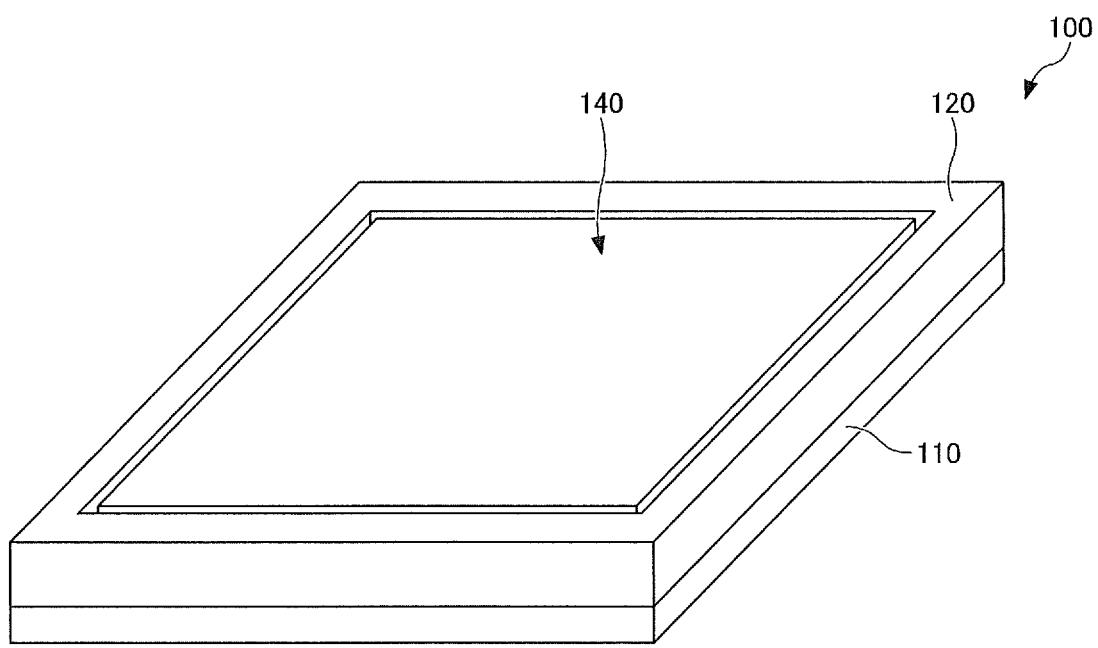
FIG. 1 is a perspective view illustrating the configuration of an operation device according to an embodiment.
Figure 2:
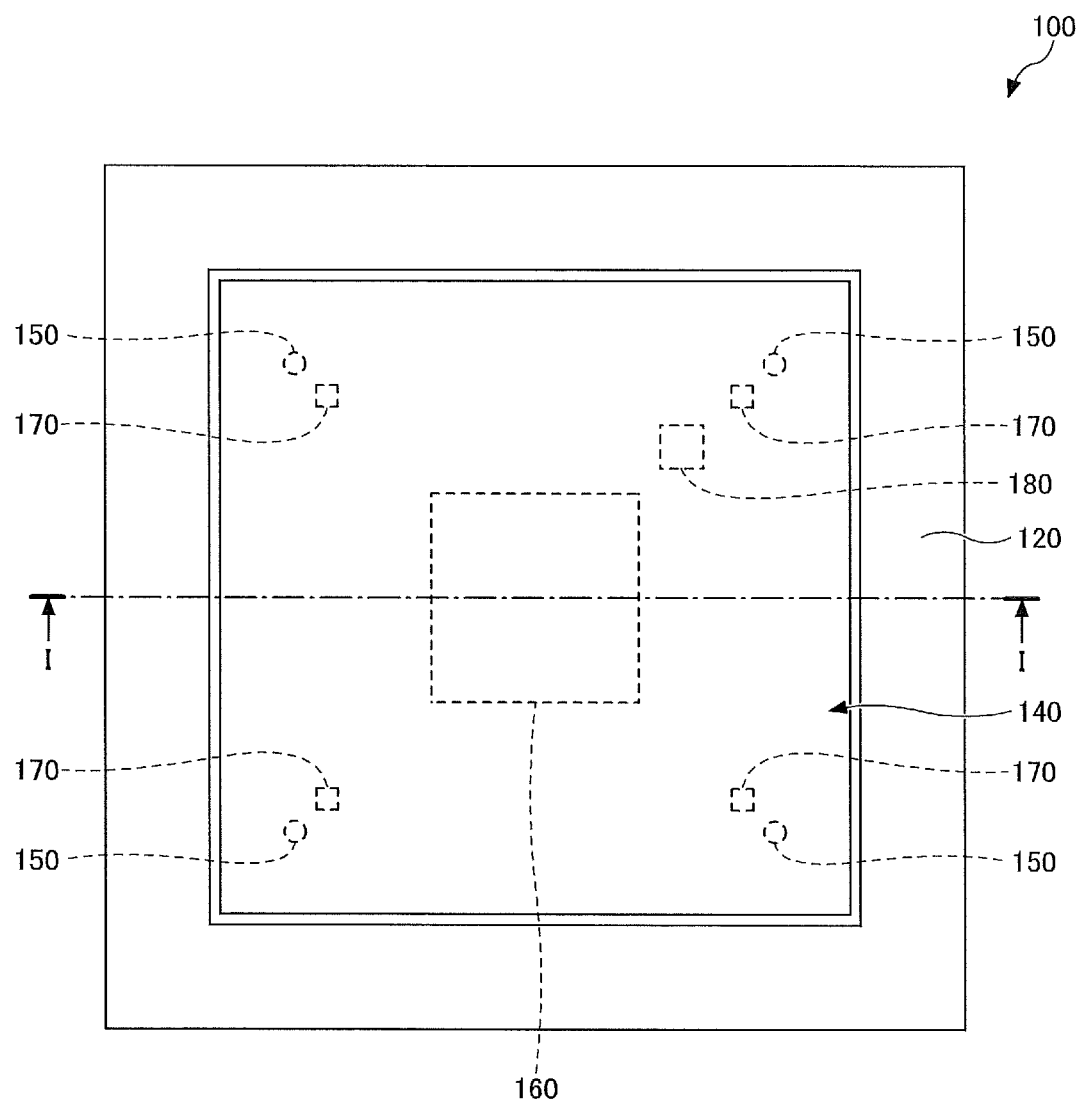
FIG. 2 is a top view illustrating the configuration of the operation device according to the embodiment.
Figure 3:
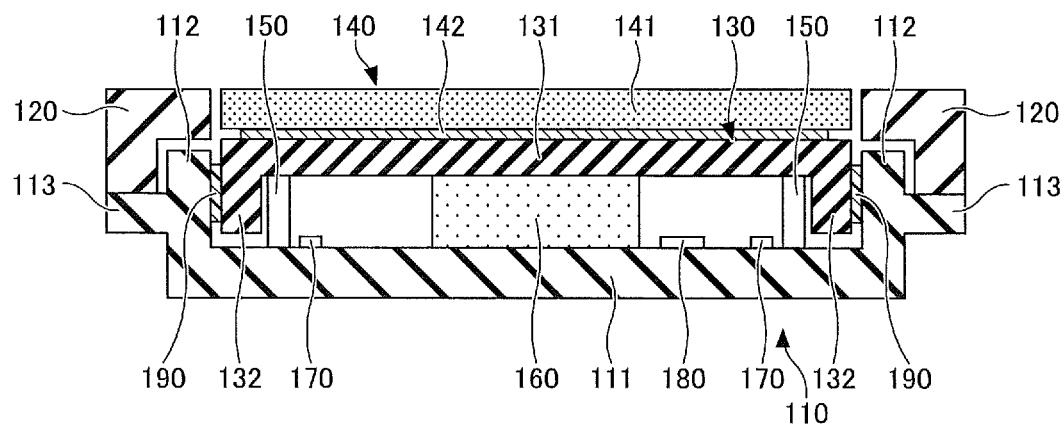
FIG. 3 is a cross-sectional view illustrating the configuration of the operation device according to the embodiment.

FIG. 1 is a perspective view illustrating the configuration of an operation device according to an embodiment. FIG. 2 is a top view illustrating the configuration of the operation device according to the embodiment. FIG. 3 is a cross-sectional view illustrating the configuration of the operation device according to the embodiment. FIG. 3 corresponds to a cross-sectional view of the operation device taken along the I-I line in FIG. 2.

As illustrated in FIGS. 1 to 3, an operation device 100 according to the embodiment includes a fixed base 110, a bezel 120 fixed on the periphery of the fixed base 110, and a decorative panel 141 inside the bezel 120. An electrostatic sensor 142 is provided on the decorative panel 141 toward the fixed base 110, and a touchpad 140 is constituted by the decorative panel 141 and the electrostatic sensor 142. A movable base 130 is provided on the touchpad 140 toward the fixed base 110. The movable base 130 includes a flat plate portion 131 that is wider than the touchpad 140 in a plan view, and includes a wall portion 132 extending from the edge of the flat plate portion 131, toward the fixed base 110. The fixed base 110 includes a flat plate portion 111 that is wider than the flat plate portion 131 in a plan view, and includes a wall portion 112 extending upwardly from the edge of the flat plate portion 111, outside the wall portion 132. The fixed base 110 includes a flange portion 113 protruding outwardly from the wall portion 112. A lower end of the bezel 120 contacts the flange portion 113.

An actuator 160 is provided on the flat plate portion 111. The actuator 160 contacts the flat plate portions 111 and 131. In a plan view, the actuator 160 is centrally situated approximately between the flat plate portions 111 and 131. Further, multiple pretensioned springs 150 each of which pulls the flat plate portions 111 and 131 towards each other are provided. The touchpad 140 is an example of an operation member, and the movable base 130 and the touchpad 140 are included in a movable portion. The fixed base 110 is an example of a fixed portion, and the actuator 160 is an example of a vibration generating unit (vibration generating device).

A panel guide 190 in contact with the wall portions 112 and 132 is provided between the wall portion 112 and the wall portion 132. The panel guide 190 may have elasticity, and guide the movable base 130 inside the fixed base 110.

Multiple reflection-type photoelectric sensors 170 are provided on the flat plate portion 111 of the fixed base 110. Each photoelectric sensor 170 irradiates the flat plate portion 131 of the movable base 130 above the photoelectric sensor 170, with light, and then receives the light reflected by the flat plate portion 131, thereby enabling a distance to a portion of the flat plate portion 131 to which light is emitted to be detected. For example, the photoelectric sensors 170 are arranged at inner positions relative to four corners of the touchpad 140, in a plan view. Each photoelectric sensor 170 is an example of a detecting unit.

Further, a controller 180 is provided on the fixed base 110. By the process described above, the controller 180 drives the actuator 160 in accordance with an operation of the touchpad 140 to thereby provide feedback on a tactile sense of a user. The controller 180 is a semiconductor chip, for example. In the present embodiment, the controller 180 is provided on the flat plate portion 111. However, the location at which the controller 180 is provided is not limiting. For example, the controller 180 may be provided at a location such as between the touchpad 140 and the movable base 130.

Figure 4:
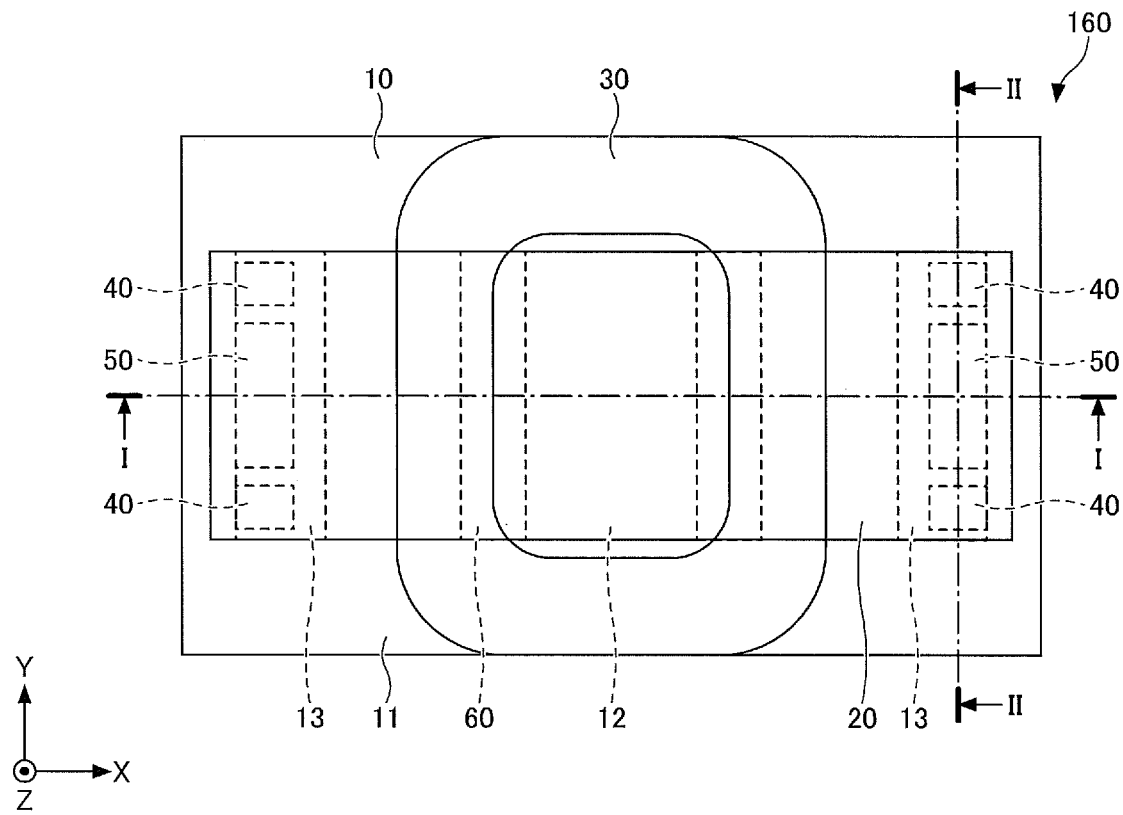
FIG. 4 is a plan view illustrating the configuration of an actuator.
Figure 5:
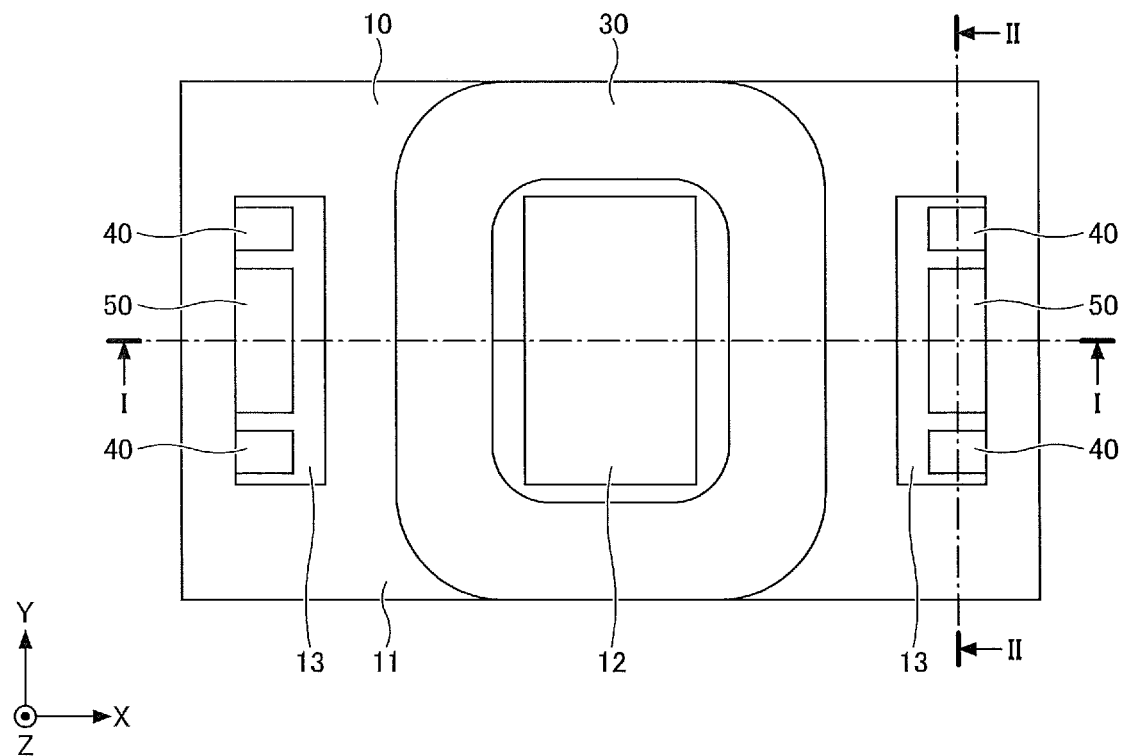
FIG. 5 is a plan view of the actuator in FIG. 4 from which a movable yoke and a permanent magnet are removed.
Figure 6A:
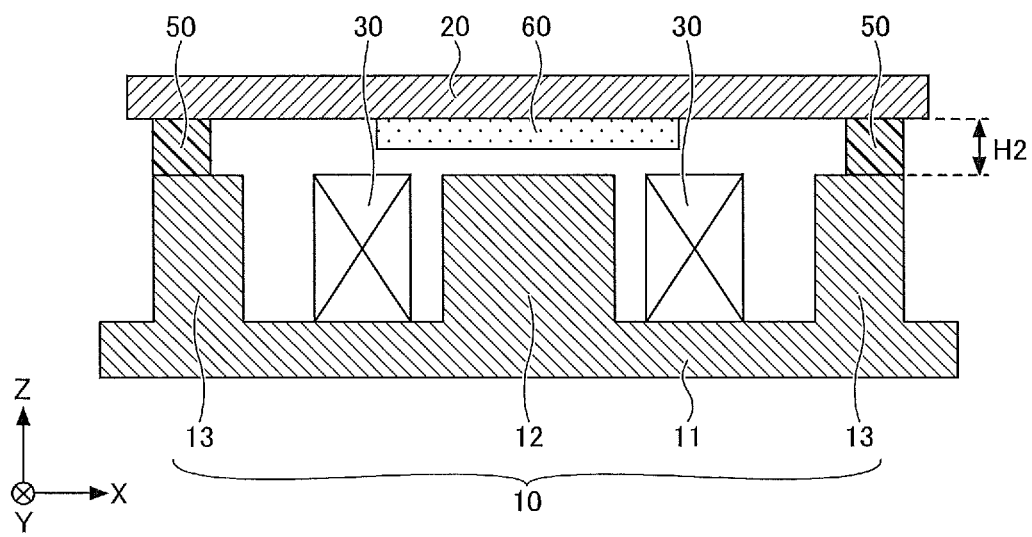
FIGS. 6A and 6B are cross-sectional views illustrating the configuration of the actuator.
Figure 6B:
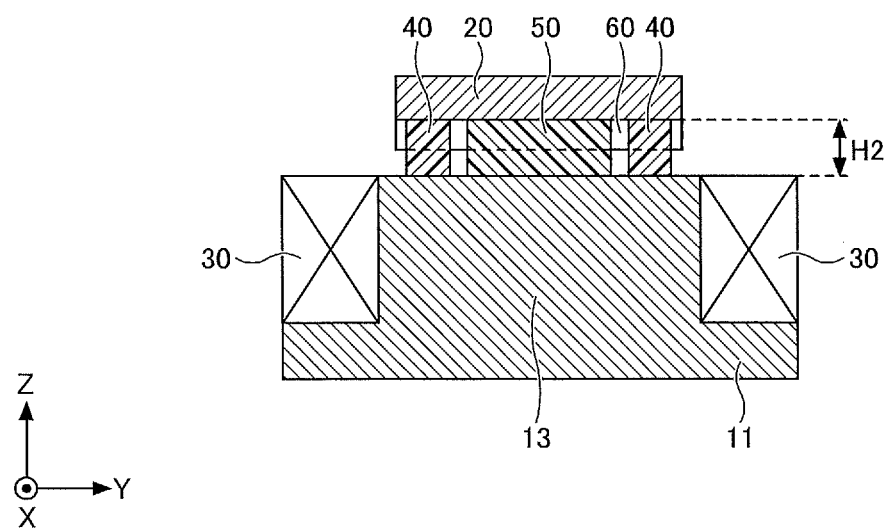

Hereafter, the configuration of the actuator 160 will be described. FIG. 4 is a plan view illustrating the configuration of the actuator 160. FIG. 5 is a plan view of the actuator in FIG. 4 from which a movable yoke and a permanent magnet are removed. FIGS. 6A and 6B are cross-sectional views illustrating the configuration of the actuator 160. FIG. 6A corresponds to a cross-sectional view taken along the I-I line in FIGS. 4 and 5. FIG. 6B corresponds to a cross-sectional view taken along the II-II line in FIGS. 4 and 5.

As illustrated in FIG. 4 to FIG. 6B, the actuator 160 includes a fixed yoke 10, a movable yoke 20, an exciting coil 30, first rubber portions 40, second rubber portions 50, and a permanent magnet 60. The fixed yoke 10 includes a plate-shaped base 11 of which the planar shape is approximately rectangular. The longitudinal direction of the base 11 is given as the X direction, the short direction thereof is given as the Y direction, and the thickness direction thereof is given as the Z direction. Each first rubber portion 40 is an example of a first elastic support, and each second rubber portion 50 is an example of a second elastic support. The Z direction corresponds to a first direction, and the X direction corresponds to a second direction.

Further, the fixed yoke 10 includes a middle protrusion 12 protruding upright (Z direction) from the middle portion of the base 11, and includes lateral protrusions 13 protruding upright (Z direction) from respective portions of the base 11 proximal to both ends of the base 11, toward the longitudinal direction (X direction). Two lateral protrusions 13 are provided at a location at which the middle protrusion 12 is interposed between the lateral protrusions 13 in the X direction. The exciting coil 30 is wound around the middle protrusion 12, between the two lateral protrusions 13. Two first rubber portions 40 and one second rubber portion 50 are provided on each of the lateral protrusions 13. In the Y direction, the second rubber portion 50 is situated between the two first rubber portions 40. The middle protrusion 12 is an example of a first protrusion, and each lateral protrusion 13 is an example of a second protrusion.

The movable yoke 20 is plate-shaped and has an approximately rectangular planar shape. The movable yoke 20 contacts the first rubber portions 40 and the second rubber portion 50 at each end portion, in the longitudinal direction (X direction). The permanent magnet 60 is attached to the surface of the movable yoke 20 toward the fixed yoke 10. Both ends of the permanent magnet 60 in the Z direction are opposite poles created by magnetization. For example, the face of the permanent magnet 60 toward the movable yoke 20 is an S pole, and the face of the permanent magnet 60 toward the fixed yoke 10 is an N pole. For example, the permanent magnet 60 is attached to the approximately middle portion of the movable yoke 20 in a plan view, so as to face the middle protrusion 12. The permanent magnet 60 magnetizes the fixed yoke 10 and the movable yoke 20, and thus the fixed yoke 10 and the movable yoke 20 are energized in a direction of coming closer to each other in the Z direction, through a magnetic attractive force.

When providing feedback on the tactile sense of the user, the controller 180 drives the actuator 160 such that the current in a direction in which a repulsive force between the movable yoke 20 and the fixed yoke 10 acts flows through the exciting coil 30. For example, when the face of the permanent magnet 60 toward the fixed yoke 10 is an N pole, the controller 180 drives the actuator 160 such that a current in a direction in which a magnetic pole on the surface of the middle protrusion 12 toward the permanent magnet 60 becomes an N pole flows through the exciting coil 30. Thus, when the current flows through the exciting coil 30, a distance between the movable yoke 20 and the fixed yoke 10 is greater than a distance set in an initial state, and subsequently, when the current does not flow, the above distance between the movable yoke 20 and the fixed yoke 10 is again set to the distance in the initial state. In such a manner, when conduction of the current is repeatedly switched on or off, the movable yoke 20 reciprocates in the Z direction when viewed from the fixed yoke 10. That is, by the current through the exciting coil 30, the movable yoke 20 vibrates in the Z direction.

Figure 7:
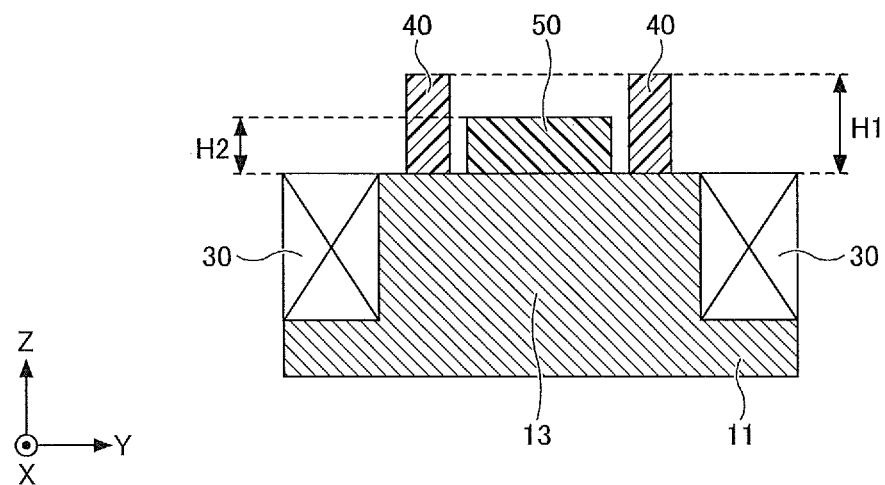
FIG. 7 is a cross-sectional view of the actuator taken along the II-II line in FIGS. 4 and 5 from which the movable yoke and the permanent magnet are removed.

Hereafter, the first rubber portions 40 and the second rubber portions 50 will be described. FIG. 7 is a cross-sectional view of the actuator taken along the II-II line in FIG. 4 and FIG. 5 in which the movable yoke 20 and the permanent magnet 60 are removed. As illustrated in FIG. 7, a free height (free length in the Z direction) H1 of each first rubber portion 40 is higher than a free height (free length in the Z direction) H2 of the second rubber portion 50. Note, however, that each first rubber portion 40 is compressed by the movable yoke 20, as illustrated in FIG. 6B, because the permanent magnet 60 and the middle protrusion 12 attract each other, as described above. For example, each first rubber portion 40 has a similar height to the free height H2 of the second rubber portion 50, in an initial state in which the current is yet to flow through the exciting coil 30. Thus, in the initial state, each first rubber portion 40 is compressed between the movable base 130 and the fixed base 110 and exerts a reaction force in the Z direction on the movable yoke 20. In contrast, each second rubber portion 50 is not compressed and thus a reaction force in the Z direction is not exerted on the movable yoke 20.

The free height H1 of each first rubber portion 40 is in the range in which the permanent magnet 60 can energize the movable yoke 20 in the direction of moving closer to the fixed yoke 10 by a magnetic attractive force, and the first rubber portions 40 are sandwiched between a given lateral protrusion 13 and the movable yoke 20. That is, the first rubber portions 40 are sandwiched between the fixed yoke 10 and the movable yoke 20. For this reason, unless intentionally disassembled, the first rubber portions 40 are held between the fixed yoke 10 and the movable yoke 20. In contrast, although the lower end of each second rubber portion 50 is secured to the upper surface of a given lateral protrusion 13, the upper end thereof only contacts the lower surface of the movable yoke 20 without being secured, and thus the upper end of each second rubber portion 50 can be separated from the movable yoke 20. Note that each first rubber portion 40 may be secured to the upper surface of a given lateral protrusion 13, the lower surface of the movable yoke 20, or both.

Figure 8:
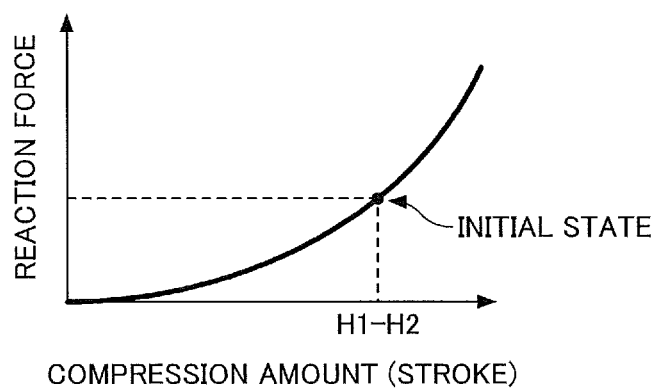
FIG. 8 is a diagram illustrating the relation between a compression amount of each first rubber portion and a reaction force exerted on the movable yoke.

FIG. 8 is a diagram illustrating the relation between a compression amount of each first rubber portion 40 and the reaction force exerted on the movable yoke 20. As described above, there is a difference between the free heights of the first rubber portion 40 and the second rubber portion 50, which indicates "H1-H2". In this case, as illustrated in FIG. 8, in the range of the compression amount (stroke) of less than "H1-H2", only each first rubber portion 40 exerts a reaction force on the movable yoke 20. When the compression amount is equal to "H1-H2", the movable yoke 20 contacts the first rubber portions 40, in addition to the second rubber portions 50. Note, however, that each second rubber portion 50 is not deformed and does not exert a reaction force on the movable yoke 20. The initial state according to the present embodiment corresponds to such a state. In the range in which the compression amount is greater than "H1-H2", the second rubber portions 50, as well as the first rubber portions 40, exert a reaction forces on the movable yoke 20.

Figure 9:
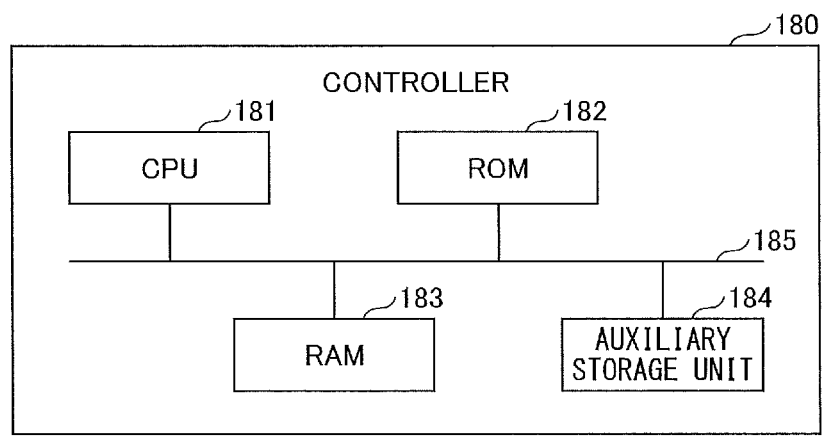
FIG. 9 is a diagram illustrating the configuration of a controller.

Hereafter, the driving of the actuator 160 by the controller 180 will be described. The controller 180 determines whether a load applied at an operation position of the touchpad 140 reaches a reference value causing feedback on the tactile sense. Based on a determined result, the controller 180 drives the actuator 160 to thereby provide the feedback on the tactile sense. FIG. 9 is a diagram illustrating the configuration of the controller 180.

The controller 180 includes a computer processing unit (CPU) 181, a read only memory (ROM) 182, a random access memory (RAM) 183, and an auxiliary storage unit 184. The CPU 181, the ROM 182, the RAM 183, and the auxiliary storage unit 184 constitute a so-called computer. The components of the controller 180 are interconnected via a bus 185.

The CPU 181 executes various programs stored in, the auxiliary storage unit 184 (for example, a program for determining a load).

The ROM 182 is a non-volatile main storage device. The ROM 182 stores various programs stored in the auxiliary storage unit 184, as well as various programs, data, and the like to be required to be executed by the CPU 181. Specifically, the ROM 182 stores a boot program and the like, such as a basic input/output system (BIOS) or an extensible firmware interface (EFI).

The RAM 183 is a volatile main storage device such as a dynamic random access memory (DRAM) or a static random access memory (SRAM). The RAM 183 serves as a work area to be expanded when the CPU 181 executes various programs stored in the auxiliary storage unit 184.

The auxiliary storage unit 184 is an auxiliary storage device that stores various programs to be executed by the CPU 181, as well as storing various data to be generated when the CPU 181 executes the various programs.

Figure 10:
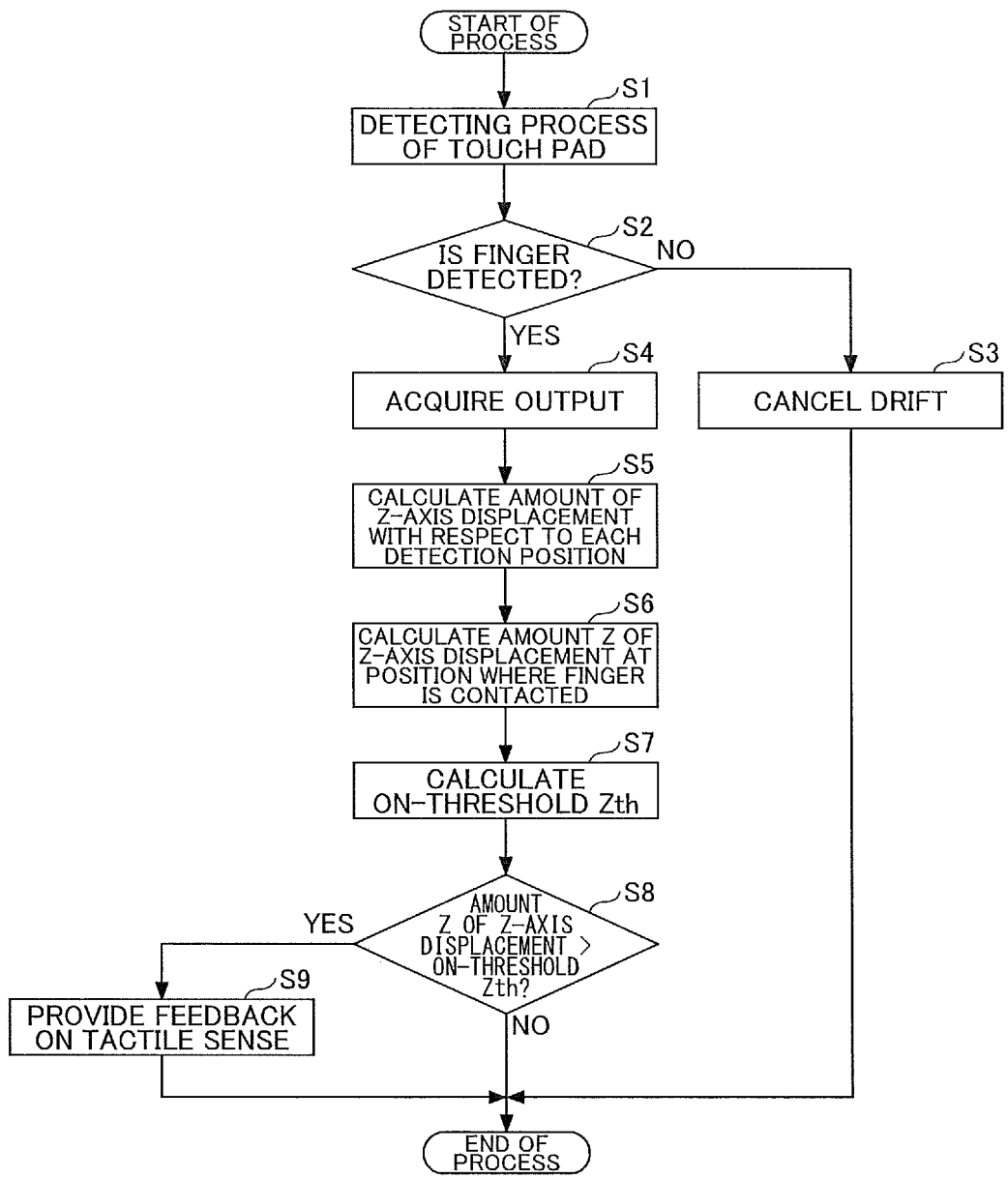
FIG. 10 is a flowchart illustrating a process of the controller.

The controller 180 has the hardware configuration described above, and performs the following process. FIG. 10 is a flowchart illustrating the process of the controller 180.

First, the controller 180 detects the touchpad 140 (step S1). Then, the controller 180 determines whether a finger is in contact with the touchpad 140 based on the output of the electrostatic sensor 142 (step S2). If a finger is not contacted, the controller 180 cancels drift of each photoelectric sensor 170 (step S3).

In contrast, when the controller 180 determines that a finger is in contact with the touchpad 140, the controller 180 acquires a detected signal from each of the photoelectric sensors 170 (step S4). For example, when an output signal of each photoelectric sensor 170 is an analog signal, the controller 180 acquires a digital signal into which the analog signal is converted.

Then, with respect to a detection position of each photoelectric sensor 170, a displacement amount of the flat plate portion 131 in a Z-axis direction is calculated based on the detected signal of the photoelectric sensor 170 (step S5).

Then, the controller 180 calculates a displacement amount Z of the touchpad 140 at a position where the touchpad 140 is operated, in the Z-axis direction (step S6). In other words, the displacement amount Z at a given operation position, in the Z-axis direction, is calculated based on the displacement amount in the Z-axis direction, which is calculated based on detected signals by all or some photoelectric sensors among four photoelectric sensors 170, as well as an X coordinate and a Y coordinate of the operation position that is detected by the touchpad 140.

Further, the controller 180 preliminarily calculates a relation between an applied load and the displacement amount in the Z-axis direction, and stores the relation in the ROM 182. Then, the controller 180 reads out the relation, and calculates a threshold (on-threshold) Zth with respect to the Z-axis direction, corresponding to the operation position (step S7).

Then, it is determined whether the displacement amount Z exceeds the on-threshold Zth (step S8). If the displacement amount Z exceeds the on-threshold Zth, the applied load is assumed to exceed a reference value and thus the actuator 160 is driven to provide feedback on the tactile sense (step S9). In this case, the controller 180 drives the actuator 160 such that the current in a direction of a repulsive force to act between the fixed yoke 10 and the movable yoke 20 flows through the exciting coil 30.

The controller 180 performs the operation described above.

In the operation device 100 with the configuration described above, in the initial state in which the current is yet to flow through the exciting coil 30, by the magnetic attractive force of the permanent magnet 60, the movable yoke 20 is energized in a direction of moving closer to the fixed yoke 10 in the Z direction, and further, the first rubber portions 40 are compressed between the movable base 130 and the fixed base 110. Accordingly, the relative position of the movable yoke 20 with respect to the fixed yoke 10 in the Z direction is stable.

Also, when the touchpad 140 is pressed and operated by the user, the first rubber portions 40 and the second rubber portions 50 each exert the reaction force on the movable yoke 20, and thus the position of the movable yoke 20 is difficult to vary. Accordingly, rattles of the actuator 160 caused by a press operation are unlikely to occur. In this regard as well, the relative position of the movable yoke 20 with respect to the fixed yoke 10 in the Z direction is easily stable.

In a plan view, the movable yoke 20 overlaps the middle protrusion 12 and the lateral protrusions 13. That is, in the Z direction, the movable yoke 20 covers the middle protrusion 12 and the lateral protrusions 13. Thus, by the magnetic attractive force of the permanent magnet 60, the movable yoke 20 attempts to be stationary at the center of the fixed yoke 10 in each of the X direction and the Y direction, with the longitudinal direction of the movable yoke 20 aligned with the longitudinal direction of the fixed yoke 10. Accordingly, the relative position of the movable yoke 20 with respect to the fixed yoke 10 is stable in each of the X direction and the Y direction.

In such a manner, the operation device 100 has excellent performance for self-positioning, and the relative position of the movable yoke 20 with respect to the fixed yoke 10 is easily stable in each of the X direction, the Y direction, and the Z direction. In other words, the pose of the movable yoke 20 is easily stable when viewed from the fixed yoke 10. Accordingly, stable vibrations can be generated when feedback on the tactile sense is provided.

Further, when feedback on the tactile sense of the user is provided, the actuator 160 is driven such that the repulsive force acts between the fixed yoke 10 and the movable yoke 20. Thus, the compression amount of each first rubber portion 40 changes to be less than "H1−H2." The second rubber portions 50 are not secured to the movable yoke 20 and can be separated from the movable yoke 20. For this reason, when the compression amount of each first rubber portion 40 is less than "H1−H2", each second rubber portion 50 does not exert the force on the movable yoke 20. As a result, the position of the movable yoke 20 easily varies, thereby enabling the vibration amount to be increased.

As described above, in the operation device 100, when the touchpad 140 is operated, the actuator 160 vibrates in a direction (first direction) perpendicular to the control surface of the touchpad 140, in accordance with a given operation position and operation load of the touchpad 140. The user feels vibrations from the control surface and thus can recognize how a given operation performed using the operation device 100 is activated, without viewing a display device provided with the operation device 100 or the like. For example, when the operation device 100 is provided in a center console for use of various switches in an automobile, a driver can recognize, based on vibrations generated by the actuator 160, how a given operation performed by the driver is activated, without viewing the operation device 100.

Note that in the initial state, the height of each first rubber portion 40 need not be the same as the free height H2 of the second rubber portion 50. For example, when the second rubber portions 50 are compressed, the height of each of the first rubber portions 40 and the second rubber portions 50 in the initial state may be lower than the free height H2 of the second rubber portion 50. In this case, the reaction force to be exerted in the press operation, in the initial state, becomes greater and thus the relative position of the movable yoke 20 with respect to the fixed yoke 10 in the Z direction can become more stable. For example, by increasing an elastic force of each pretensioned spring 150, the second rubber portions 50 can be compressed in the initial state.

Also, in the initial state, the movable yoke 20 does not contact the second rubber portions 50 and thus a gap between the movable yoke 20 and each second rubber portion 50 may exist. In this case, when the touchpad 140 is pressed and operated to define a gap exceeding a size (predetermined amount) of the gap, the second rubber portions 50 are compressed. Even in this case, in the initial state, effects of stabilizing the relative position of the movable yoke 20 with respect to the fixed yoke 10 in the Z direction can be obtained. Further, the second rubber portions 50 may not be provided. Even in this case, effects of stabilizing the relative position of the movable yoke 20 with respect to the fixed yoke 10 in the Z direction can be obtained in the initial state.

The compression amount of each first rubber portion 40 in the initial state depends on, for example, an elastic force of each of the first rubber portions 40, the second rubber portions 50, the pretensioned springs 150, and the like, as well as the magnetic force of the permanent magnet 60. Thus, the above compression amount can be suitably adjusted from the choice of such options.

The upper end and the lower end of each first rubber portion 40 may be respectively secured to the movable yoke 20 and a given lateral protrusion 13. Alternatively, the upper end of each first rubber portion 40 is secured to the movable yoke 20, and the lower end of each first rubber portion 40 may be only closely attached to a given lateral protrusion 13 without being secured to the lateral protrusion 13. Also, the lower end of each first rubber portion 40 may be secured to a given lateral protrusion 13, and the upper end of each first rubber portion 40 may be only attached closely to the movable yoke 20 without being secured to the movable yoke 20. By simply securing one among the upper end and lower end of each first rubber portion 40 to the movable yoke 20, as well as attaching another end of each first rubber portion 40 closely without being secured, assembly activity can be improved.

Figure 11A:
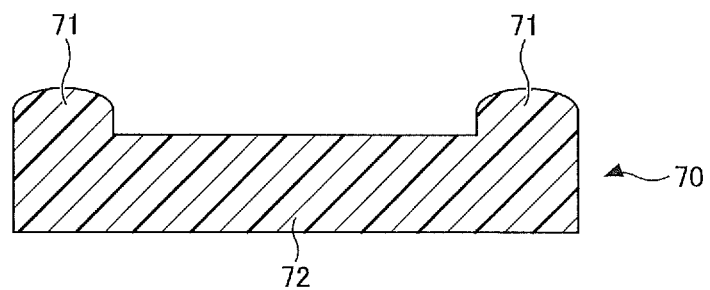
FIGS. 11A to 11C are cross-sectional views of rubber portions according to the modification.
Figure 11B:
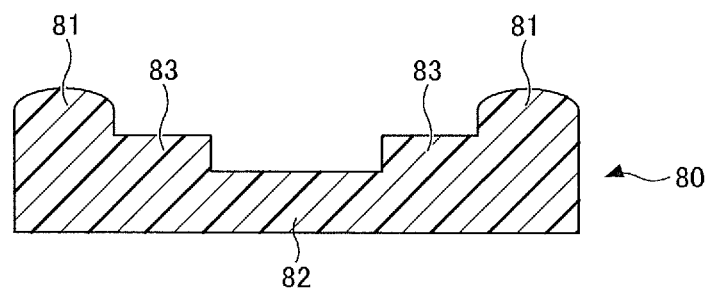
Figure 11C:
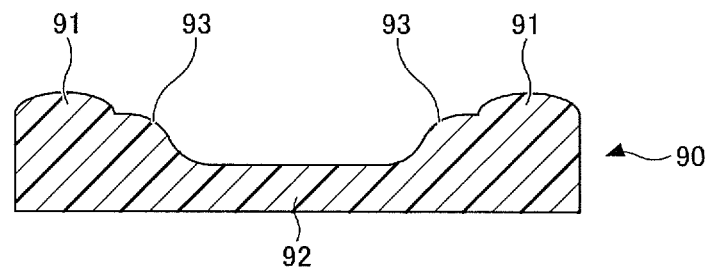

The first rubber portions 40 and the second rubber portion 50 may be integrated. FIGS. 11A to 11C are cross-sectional view illustrating rubber portions according to the modification. As illustrated in FIG. 11A, a rubber portion 70 with first portions 71 at both ends, each of which has a height lower than a height of a second portion 72 in the middle portion of the rubber, may be used instead of a combination of two first rubber portions 40 and one second rubber portion 50.

As illustrated in FIG. 11B, a rubber portion 80 having a height that is varied in three steps may be used. The rubber portion 80 includes first portions 81 at both ends, a second portion 82 in the middle portion of the rubber, and third portions 83 each of which is between a given first portion 81 and the second portion 82. The first portions 81 are at the highest, and the second portion 82 is at the lowest. When the rubber portion 80 is used, for example, in an initial state, the first portions 81 and the third portions 83 are compressed by the movable yoke 20 and thus a gap is provided between the movable yoke 20 and the second portion 82. An upper surface of the second portion 82 can be used as a receiving surface for an excessive pressing force.

As illustrated in FIG. 11C, a rubber portion 90 with a continuously varying area to contact the movable yoke 20 may be used. If the area to contact the movable yoke 20 varies discontinuously (gradually), a user might feel a gradual change at a timing at which the area is varied. However, when the rubber portion 90 is used, such a feel of the gradual change can be mitigated. The rubber portion 90 has first portions 91 at both ends, a second portion 92 in the middle portion of the rubber, and third portions. 93 each of which is between a given first portion 91 and the second portion. The first portions 91 are the highest, and the second portion 92 is the lowest. Also, the height of each third portion 93 varies continuously between a given first portion 91 and the second portion 92. When the rubber portion 90 is used, for example, in an initial state, the first portions 91 and the third portions 93 are compressed by the movable yoke 20 and thus a gap is provided between the movable yoke 20 and the second portion 92. An upper surface of the second portion 92 can be used as a receiving surface for an excessive pressing force.

Figure 12:
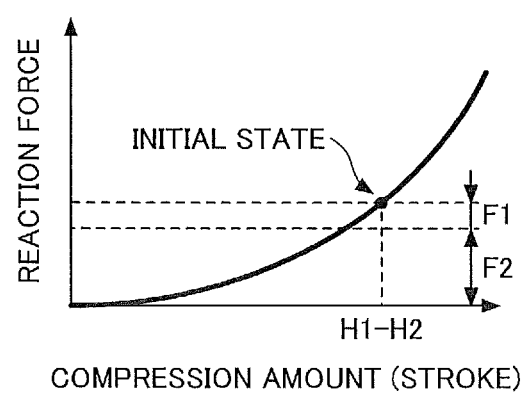
FIG. 12 is a diagram illustrating an example of a component of the reaction force exerted on the movable yoke.

A compression amount of a given rubber portion in the initial state depends on, for example, an elastic modulus and height of each pretensioned spring 150, the magnetic force of the permanent magnet 60, and the like. Thus, the above compression amount can be suitably adjusted from the choice of such options. FIG. 12 illustrates an example of a component of the reaction force exerted on the movable yoke 20. For example, as illustrated in FIG. 12, the compression amount of each first rubber portion 40 can be adjusted by the sum of an elastic force F1 of each pretensioned spring 150 and a magnetic force F2 of the permanent magnet 60.

Note that when the fixed base 110 supports the movable base 130 to allow the movable base 130 to vibrate and the first rubber portions 40 are compressed in the initial state between the fixed base 110 and the movable base 130, the first rubber portions 40 may be provided outside the actuator 160. Note, however, that in order to make the operation device compact, the first rubber portions 40 are preferably sandwiched between the movable yoke 20 and the fixed yoke 10.

The operation member is not limited to an operation panel member such as the touchpad 140. The operation member may be a push button having a control surface.

Note that one or more non-contact position detecting sensors such as electrostatic sensors may be used instead of the photoelectric sensors 170. Also, a pressure-sensitive sensor may be used to detect pressure that is applied to the touchpad 140.

In the above embodiments, the permanent magnet 60 is attached to the movable yoke 20, and the exciting coil 30 is attached to the fixed yoke 10. However, the permanent magnet 60 is attached to the fixed yoke 10, and the exciting coil 30 may be attached to the movable yoke 20. The second rubber portions 50 may be also secured to the movable yoke 20, instead of the lateral protrusions 13.

The operation device in the present disclosure is particularly suitable for an operation device provided in a center console in an automobile. The center console is provided with respect to a portion between a driver's seat and a front passenger's seat, and a given operation device provided in the center console may have a complicated planar shape. According to the operation device in the present disclosure, a magnitude of the vibration from a given control surface is stable, and feedback on the tactile sense can be suitably provided, even when a given operation member has a complicated planar shape.

The preferred embodiments have been described above in detail. However, the embodiments are not limiting. Various modifications and substitutions to the embodiments can be made without departing from a scope set forth in the claims.

What is claimed is:

1. An operation device comprising:
a movable portion including an operation member to be operated by pressing the operation member;
a vibration generating unit configured to cause the movable portion to vibrate in a first direction perpendicular to a control surface of the operation member;
a fixed portion supporting the movable portion via a first elastic support to allow the movable portion to vibrate;
a detecting unit configured to detect that the operation member is operated by pressing the operation member; and
a control unit configured to drive the vibration generating unit in accordance with a detected result by the detecting unit,
wherein the vibration generating unit includes
a movable yoke attached to the movable portion;
a fixed yoke attached to the fixed portion and disposed facing the movable yoke in the first direction;
a permanent magnet attached to one yoke among the movable yoke and the fixed yoke, both ends of the permanent magnet in the first direction being opposite magnetic poles created by magnetization; and
an exciting coil attached to a different yoke from the one yoke among the movable yoke and the fixed yoke, the exciting coil being configured to induce magnetic flux in response to a current flowing through the exciting coil,
wherein in an initial state in which the current is yet to flow through the exciting coil, by a magnetic attractive force of the permanent magnet, the movable yoke is configured to be energized in a direction of moving closer to the fixed yoke in the first direction, the first elastic support being compressed between the movable portion and the fixed portion, and wherein the current flowing through the exciting coil causes a repulsive force to act between the movable yoke and the fixed yoke.

2. The operation device according to claim 1, wherein when the operation member is operated by pressing the operation member, the first elastic support is configured to be further compressed from the initial state.

3. The operation device according to claim 1, wherein the first elastic support is disposed between the movable yoke and the fixed yoke.

4. The operation device according to claim 1, further comprising a second elastic support between the movable yoke and the fixed yoke,
   wherein one end of the second elastic support is secured to one yoke among the movable yoke and the fixed yoke, and another end of the second elastic support is capable of being separated from a different yoke from the one yoke among the movable yoke and the fixed yoke, and
   wherein in the first direction, the first elastic support has a free length greater than a free length of the second elastic support.

5. The operation device according to claim 4, wherein in the initial state, the another end of the second elastic support contacts the different yoke from the one yoke among the movable yoke and the fixed yoke.

6. The operation device according to claim 4, wherein the first elastic support and the second elastic support are integrated.

7. The operation device according to claim 1, wherein the fixed yoke includes
   a base;
   a first protrusion protruding from the base toward the movable yoke; and
   two second protrusions each protruding from the base toward the movable yoke, the first protrusion being interposed between the second protrusions, in a second direction along the control surface,
   wherein the movable yoke covers the first protrusion and the second protrusions, in the first direction.

8. A vibration generating device comprising:
   a movable yoke;
   a fixed yoke disposed facing the movable yoke in a first direction;
   a permanent magnet attached to one yoke among the movable yoke and the fixed yoke, both ends of the permanent magnet in the first direction being opposite magnetic poles created by magnetization;
   an exciting coil attached to a different yoke from the one yoke among the movable yoke and the fixed yoke, the exciting coil being configured to induce magnetic flux in response to a current flowing through the exciting coil; and
   a first elastic support disposed between the movable yoke and the fixed yoke, the first elastic support holding the movable yoke to allow the movable yoke to vibrate with respect to the fixed yoke,
   wherein in an initial state in which the current is yet to flow through the exciting coil, by a magnetic attractive force of the permanent magnet, the movable yoke is configured to be energized in a direction of moving closer to the fixed yoke in the first direction, the first elastic support being compressed between the movable yoke and the fixed yoke, and
   wherein the current flowing through the exciting coil causes a repulsive force to act between the movable yoke and the fixed yoke.

9. The vibration generating device according to claim 8, further comprising a second elastic support between the movable yoke and the fixed yoke,
   wherein one end of the second elastic support is secured to one yoke among the movable yoke and the fixed yoke, and another end of the second elastic support is capable of being separated from a different yoke from the one yoke among the movable yoke and the fixed yoke, and
   wherein in the first direction, the first elastic support has a free length greater than a free length of the second elastic support.

10. The vibration generating device according to claim 9, wherein in the initial state, the another end of the second elastic support contacts the different yoke from the one yoke among the movable yoke and the fixed yoke.

11. The vibration generating device according to claim 9, wherein the first elastic support and the second elastic support are integrated.

12. The vibration generating device according to claim 8, wherein the fixed yoke includes
   a base;
   a first protrusion protruding from the base toward the movable yoke; and
   two second protrusions each protruding from the base toward the movable yoke, the first protrusion being interposed between the second protrusions, in a second direction perpendicular to the first direction,
   wherein the movable yoke covers the first protrusion and the second protrusions, in the first direction.

\* \* \* \* \*